Dec. 22, 1953  C. E. ZARTH  2,663,061
TIRE BEAD LOCK CLIP
Filed Aug. 18, 1950

*INVENTOR.*
CHARLES E. ZARTH
BY
*R. L. Miller*
ATTORNEY

Patented Dec. 22, 1953

2,663,061

UNITED STATES PATENT OFFICE 2,663,061

TIRE BEAD LOCK CLIP

Charles E. Zarth, Akron, Ohio, assignor to Wingfoot Corporation, Akron, Ohio, a corporation of Delaware Application August 18, 1950, Serial No. 180,140

2 Claims. (Cl. 24—81)

This invention relates to means for preventing a tire from being displaced from its seat on the rim of a vehicle wheel in motion after complete deflation or a substantial reduction in the inflation pressure. More particularly, it relates to a very simple and economical means of retaining the tire beads on the bead seat of the rim in the event that the tire becomes deflated to an extent such that the beads will become dislodged by the continued motion of the vehicle.

One object of the invention is to provide a means to prevent the inadverent displacement of the tire beads from the bead seats in the event that the tire is deflated without interfering with the normal functioning of the tire.

Another object of the invention is to provide a means for retaining the beads of a tire on the bead seats that allows the tire to be easily removed if desired without destroying the means for reuse.

A still further object is to provide a simple and foolproof means to positively retain the tire beads on the bead seats under varying conditions of loading and inflation.

Another object of the invention is to provide a means of preventing the loss of control of the vehicle if the tire should suddenly be deflated and also allow the vehicle to be driven some distance after deflation.

Other objects of this invention will become apparent hereinafter as the description thereof proceeds, the novel features, arrangements and combinations being clearly pointed out in the specification and in the claims thereunto appended.

In modern transportation, the use of pneumatic tires has become practically universal and normally there is very little difficulty encountered in their use. There has, however, long been a genuine need for a satisfactory device or method to retain the beads of the tire on the bead seat of the rim in the event that the tire should become deflated while the vehicle is in motion. With such a device, the vehicle could be brought to a stop safely or even driven to a more convenient place for repair. Several methods of accomplishing this have been suggested but they have some limitations as to their applicability.

One method is to form the rim with a raised circumferential ridge or roll on the bead seat lying just inside of the tire bead, but this method is only applicable to a rim of the drop center type used for passenger vehicles. Another method involves the use of a metal clip that extends between the bead and bead seat from around the toe of the bead to beyond the rim retaining flange and after the tire is inflated and in position on the rim, the portion extending over the retaining flange is bent down over the flange. This clip holds the bead in position on the bead seat but is not satisfactory for commercial use because of the difficulty in bending, breakage of the clip, and also such clips are not reusable. It has also been suggested that various types of elements be incorporated into the tire structure that can be attached to or clipped over the retaining flange of the rim.

None of the above-described methods has been universally adopted because of the necessary limitations. The present invention, however, is one that is applicable to any type of rim and once the clip is placed in the proper position on the tire, nothing further need be done as the clip is forced into the operative position as the tire is inflated.

Figure 1:
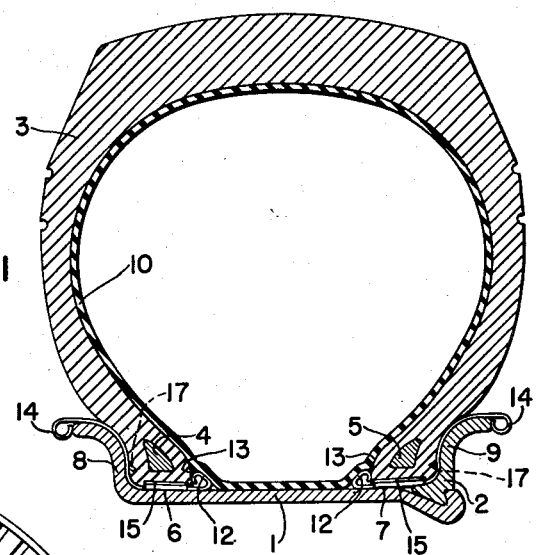
Fig. 1 is a radial section taken through a tire and rim with the bead clips in position.
Figure 2:
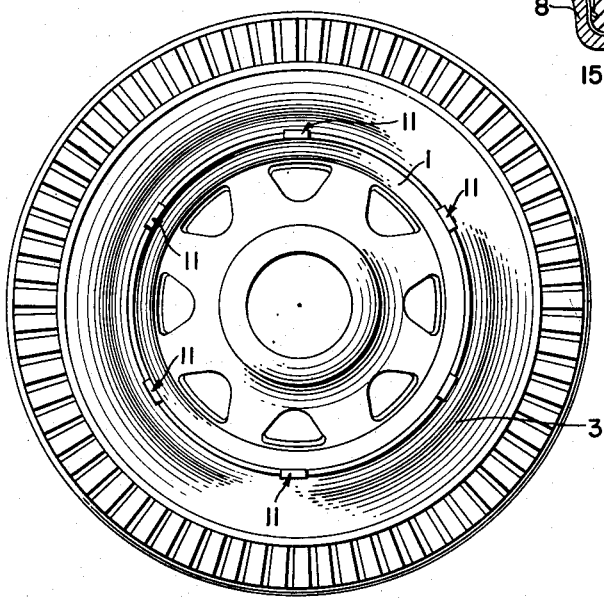
Fig. 2 is an elevation of a tire and rim assembly.

For the purposes of illustration, in Figs. 1 and 2 the reference character 1 represents generally a conventional rim of the truck tire type with a split retaining ring 2 on one side. A tire 3 of conventional construction with relatively inextensible bead portions 4 and 5 is mounted on the rim 1 and the beads 4 and 5 are in engagement with the bead seats 6 and 7, respectively, of the rim 1 according to the usual practices. Although a flat base rim is used to illustrate the invention, it is to be understood that the invention may be suitably adapted for use with any type of rim such, for example, as a drop center type with or without a separate retaining ring.

The tire beads 4 and 5 are normally held against the retaining flange portions 8 and 9 of the rim by the air pressure in the tube 10. If the pressure should suddenly be released, however, such as by a blowout, or becomes low for any other reason while the vehicle is in motion, the beads 4 and 5 frequently will be dislodged from the bead seats and the tire 3 will collapse. This makes the vehicle very difficult, if not impossible, to control, even at low speeds. In many instances, it is desirable to drive the vehicle, even at very low speeds, to a repair station or at least to a position of less danger. This is particularly true of military vehicles in the time of combat.

In order to prevent the beads 4 and 5 from becoming dislodged from their bead seats 6 and 7, this invention contemplates the use of a plurality of bead clips 11 in circumferentially spaced relation (shown in Fig. 2) around the tire beads 4 and 5 of the tire 3 before mounting the tire on the rim 1. The number of clips 11 used depends upon the tire size and probable service conditions.

Figure 3:
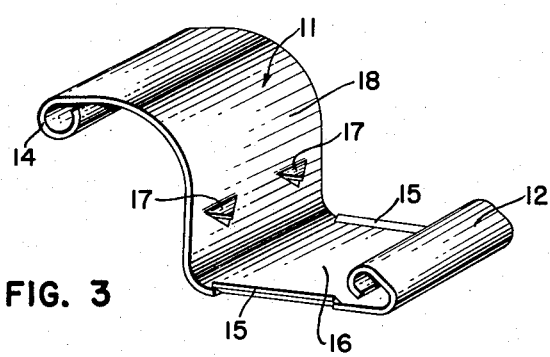
Fig. 3 represents a perspective view of the preferred form of the bead clip at an enlarged scale.

Fig. 3 best illustrates the construction of the bead clip 11 in which a metal strip, preferably of a resilient material such as spring steel, is employed. The rolled edge 12 projects upwardly and fits snugly around the inner surface 13 of the toe of the bead 4, 5 (see Fig. 1) but at the same time is preferably shaped so as not to interfere with normal tube flexing or cause tube chafing. The clip 11 closely follows the contour of the bead seat 6, 7 and retaining flange 8, 9 of the rim 1 to the edge of the flange where a roll 14 is formed on the outer extremity of the clip to extend down over the edge of the retaining flange 8, 9.

In the preferred form of the invention, in order that the clip may be better held in position on the tire, the edges 15 of the base portion 16 of the clip are turned slightly upwardly to engage the base of the tire bead and downwardly and inwardly projecting barbed points 17 are formed in the retaining flange portion 18 of the clip. The turned-up edges 15 and the barbed points 17 grip or bite into the bead and adjacent sidewall portion of the tire to prevent the clip from moving relatively to the tire and to assist in holding the clip in position on the tire while it is being mounted on the rim 1.

The clips 11 are circumferentially spaced on each bead of the tire and then the tire is slipped over the rim 1 and the retaining flange 2 is placed in position. The inner tube 10 is then inflated in the usual manner and as the pressure forces the beads of the tire 3 into firm engagement with the retaining flanges 8 and 9 of the rim. The rolled edge 14 of the clip 11 snaps over the edge of the retaining flanges 8, 9 of the rim. The clips remain in this position and are inoperative until the tire is deflated.

In operation, the clips 11 are positioned between the tire beads and bead seats of the rim as shown in Fig. 1, which prevents the tire bead 4, 5 from becoming inadvertently dislodged from the bead seats 6, 7. The roll 14 being engaged with the edge of the retaining flange 8, 9 of the rim prevents the clip 11 from moving away from the retaining flange toward the center of the rim. The tire bead 4, 5 is held against the retaining flange portion 18 of the clip by the rolled edge 12 and consequently the tire beads 4 and 5 are retained on the bead seats 6 and 7 until the rolled edge 14 is released from engagement with the edge of the retaining flange. The roll 14 is prevented from inadvertently raising or snapping over the edge of the retaining flange by the sidewalls of the deflated tire which are then overhanging the retaining flanges of the rim.

In order to remove the tire from the rim, it is only necessary to snap the roll 14 up so that it may clear the edge of the retaining flange 8, 9 and then the tire can be removed in the usual manner.

While certain representative embodiments and details have been shown for the purpose of illustrating the invention, it will be apparent to those skilled in this art that various changes and modifications may be made therein without departing from the spirit or scope of the invention.

I claim:

1. A tire bead lock clip for use in combination with a tire and rim assembly, said clip comprising a strip of resilient material having a radially outwardly rolled end portion at the inner end, a flat portion extending transversely from said rolled end portion, a third portion extending radially outwardly from said flat portion and then curved laterally, said last named radially outward portion being formed with lateral barbs, and said third portion terminating in a radially inwardly extending rolled end portion, said first-mentioned rolled end portion engaging a portion of the tire adjacent the rim and said second-mentioned rolled end portion engaging a portion of the rim adjacent the tire.

2. A tire bead lock clip for use in combination with a tire and rim assembly, said clip comprising a strip of resilient material having a radially outwardly rolled end portion at the inner end, a flat portion extending transversely from said rolled end portion and being formed with upwardly extending edge portions, and a third portion extending radially outwardly from said flat portion and then curved laterally and terminating in a radially inwardly extending rolled end portion, said first-mentioned rolled end portion engaging a portion of the tire adjacent the rim and said second-mentioned rolled end portion engaging a portion of the rim adjacent the tire.

CHARLES E. ZARTH.

References Cited in the file of this patent

UNITED STATES PATENTS

| Number | Name | Date |
| --- | --- | --- |
| 1,194,433 | Silberman | Aug. 15, 1916 |
| 1,228,355 | Anderson | May 29, 1917 |
| 2,067,448 | Horn | Jan. 12, 1937 |
| 2,137,416 | Rubsam | Nov. 22, 1938 |
| 2,146,453 | Stahl | Feb. 7, 1939 |
| 2,427,216 | Kraft | Sept. 9, 1947 |
| 2,457,360 | Flora | Dec. 28, 1948 |
| 2,585,140 | Lencki | Feb. 12, 1952 |